(12) United States Patent
Tran

(10) Patent No.: US 7,264,229 B2
(45) Date of Patent: Sep. 4, 2007

(54) EVAPORATIVE COOLER

(76) Inventor: Chuong H. Tran, 11300 E. Calle Linda Vista, Tucson, AZ (US) 85748

( * ) Notice: Subject to any disclaimer, the term of this patent is extended or adjusted under 35 U.S.C. 154(b) by 108 days.

(21) Appl. No.: 11/135,891

(22) Filed: May 24, 2005

(65) Prior Publication Data

US 2005/0258555 A1 Nov. 24, 2005

Related U.S. Application Data

(60) Provisional application No. 60/573,859, filed on May 24, 2004.

(51) Int. Cl.
*B01F 3/04* (2006.01)
(52) U.S. Cl. ................... 261/29; 261/106; 261/DIG. 43
(58) Field of Classification Search .................. 261/29, 261/36.1, 106, 107, DIG. 3, DIG. 43
See application file for complete search history.

(56) References Cited

U.S. PATENT DOCUMENTS

| | | | | |
|---|---|---|---|---|
| 2,156,888 A | * | 5/1939 | Wester | ........................ 261/106 |
| 4,049,150 A | * | 9/1977 | Goettl | ........................ 220/62.1 |
| 4,499,030 A | * | 2/1985 | Stewart | .......................... 261/3 |
| 4,556,521 A | * | 12/1985 | Baigas, Jr. | ................... 261/94 |
| 4,602,487 A | * | 7/1986 | Seeley | ........................... 62/304 |
| 4,977,756 A | * | 12/1990 | Brock | ............................ 62/314 |
| 5,081,104 A | * | 1/1992 | Orson, Sr. | ...................... 512/3 |

* cited by examiner

*Primary Examiner*—Scott Bushey
(74) *Attorney, Agent, or Firm*—Chandler & Udall, LLP; Dale F. Regelman

(57) ABSTRACT

An evaporative cooler apparatus is disclosed. The evaporative cooler apparatus comprises a bottom and a top, where the bottom and the top are identically dimensioned, and where the top and the bottom are interchangeable. The evaporative cooler apparatus further comprises a U-shaped vertical element disposed between the bottom and the top, where that vertical element comprises a porous material. The evaporative cooler apparatus does not comprise one or more metal or plastic sides formed to include a plurality of apertures.

7 Claims, 4 Drawing Sheets

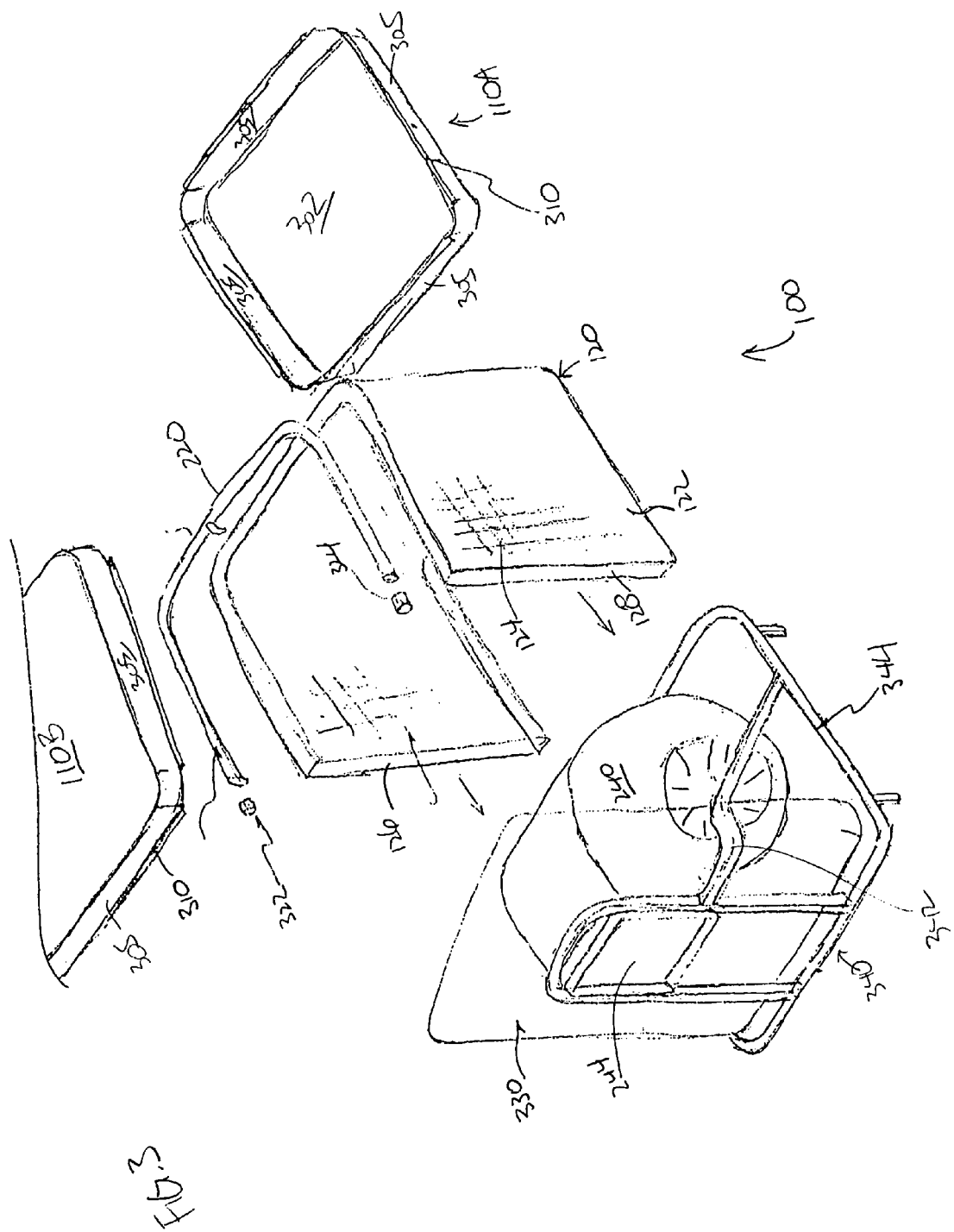

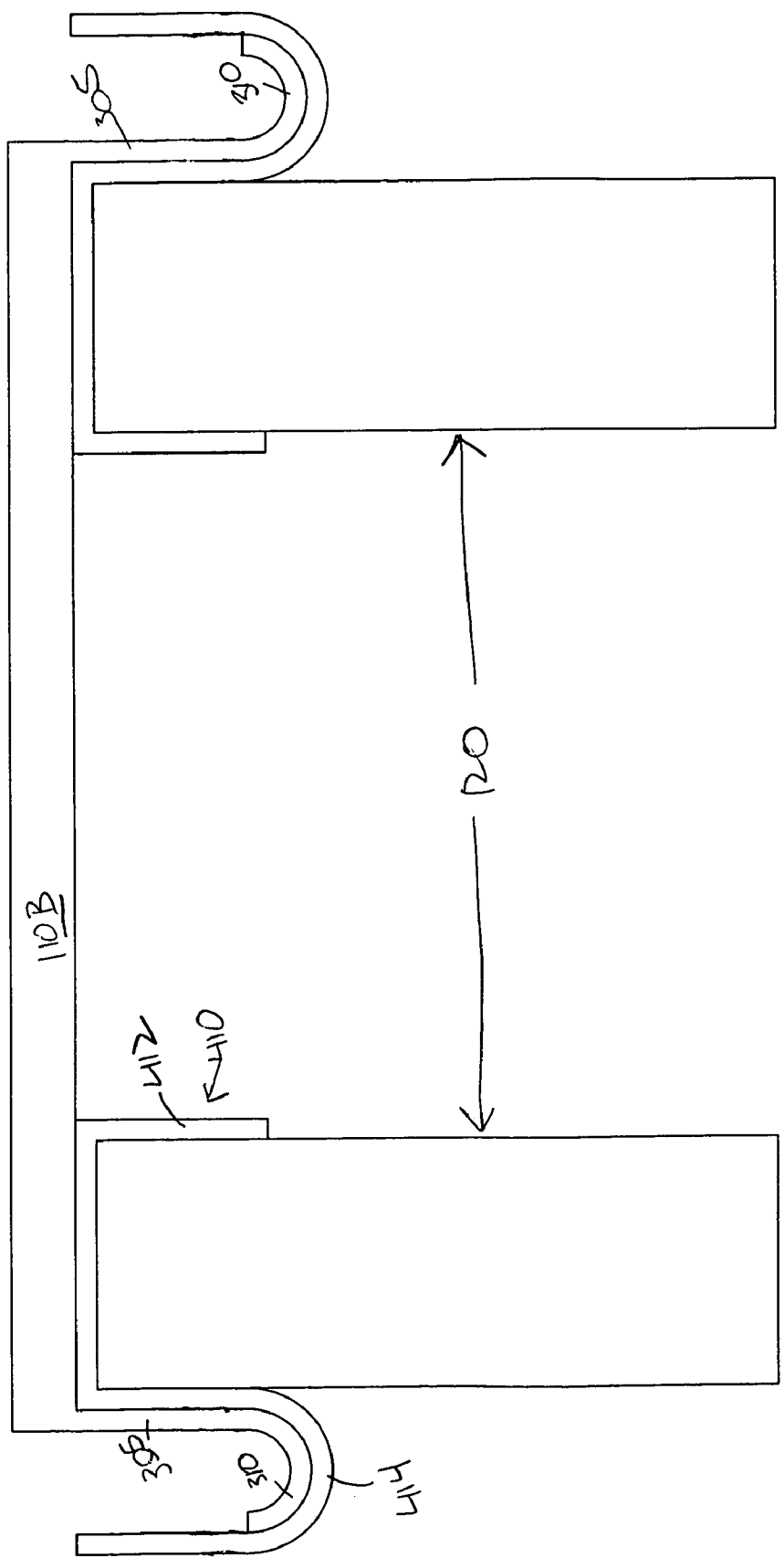

US 7,264,229 B2

EVAPORATIVE COOLER

This Application claims priority from a U.S. Provisional Application having Ser. No. 60/573,859, filed May 24, 2004.

FIELD OF THE INVENTION

This invention relates generally to cooling systems and more particularly to evaporative coolers.

BACKGROUND OF THE INVENTION

Evaporative coolers utilize the evaporation of water to cool a flow of air. These coolers are particularly effective in hot dry climes and have been proven to be extremely effective and cost effective.

In general, water is passed over a pad through which ambient air is drawn. As the hot ambient air contacts the water in the pad, some of the water evaporates, thereby cooling the air. A water pump is used to circulate water over the pad. Excess water is collected and stored in a basin. A blower is typically used to create the air-flow through the pad.

One of the major problems with evaporative cooling systems is the cleaning of the system. This typically requires the removal of a housing and then allowing the basin to dry. Once the basin is dry, collected debris is removed from the basin by hand; this often becomes a laborious process since parts of the basin are difficult to access. Once cleansed for winter, the cooler remains outside, requiring re-clean at start-up.

Another problem with typical systems is the rapid corrosion of the metal parts involved. The presence of water (both liquid and vapor) causes the metal parts to rapidly rust and deteriorate. While plastics have been used, these have proven particularly problematic as heat often causes the plastic to become brittle and break easily.

It is clear there is a need for an improved evaporative cooling mechanism which will allow for improved life and ease in cleaning.

SUMMARY OF THE INVENTION

Applicant's invention comprises an evaporative cooling apparatus. The apparatus comprises a bottom, a top where the bottom and the top are identically dimensioned, and where the top and the bottom are interchangeable. The apparatus further comprises a U-shaped vertical element disposed between the bottom and the top, where that vertical element comprises a porous material. Applicant's evaporative cooling apparatus does not comprise one or more metal or plastic sides formed to include a plurality of apertures.

BRIEF DESCRIPTION OF THE DRAWINGS

The invention will be better understood from a reading of the following detailed description taken in conjunction with the drawings in which like reference designators are used to designate like elements, and in which:

FIG. 3 is a perspective view showing certain additional elements of Applicant's evaporative cooling apparatus; and FIG. 4 is a cross-sectional view showing a top portion removeably attached to Applicant's vertical element portion of the evaporative cooling apparatus.

DETAILED DESCRIPTION OF THE PREFERRED EMBODIMENTS

This invention is described in preferred embodiments in the following description with reference to the Figures, in which like numbers represent the same or similar elements.

The evaporative cooler of the present invention provides for an interchangeable top and bottom. The top and the bottom are identical in construction. The bottom is removeably disposed in a frame. The bottom and the top may be interchanged when the bottom begins to show signs of rust or corrosion thereby increasing the useful life of the cooler.

Prior art evaporative cooling devices comprise a six-sided enclosure wherein one, two, three, or four, of those sides comprise metal or rigid plastic formed to include a plurality of apertures through which ambient air is drawn into the interior of the device. Typically, the surface area of such prior art metal/plastic side structures comprise less than about fifty percent (50%) aperture portions and more than about fifty percent (50%) plastic/metal. A separate, individual filter element is disposed within the cooler housing adjacent each of aperture-containing sides. Applicant's cooling apparatus does not comprise such a traditional six-sided housing.

Figure 1:
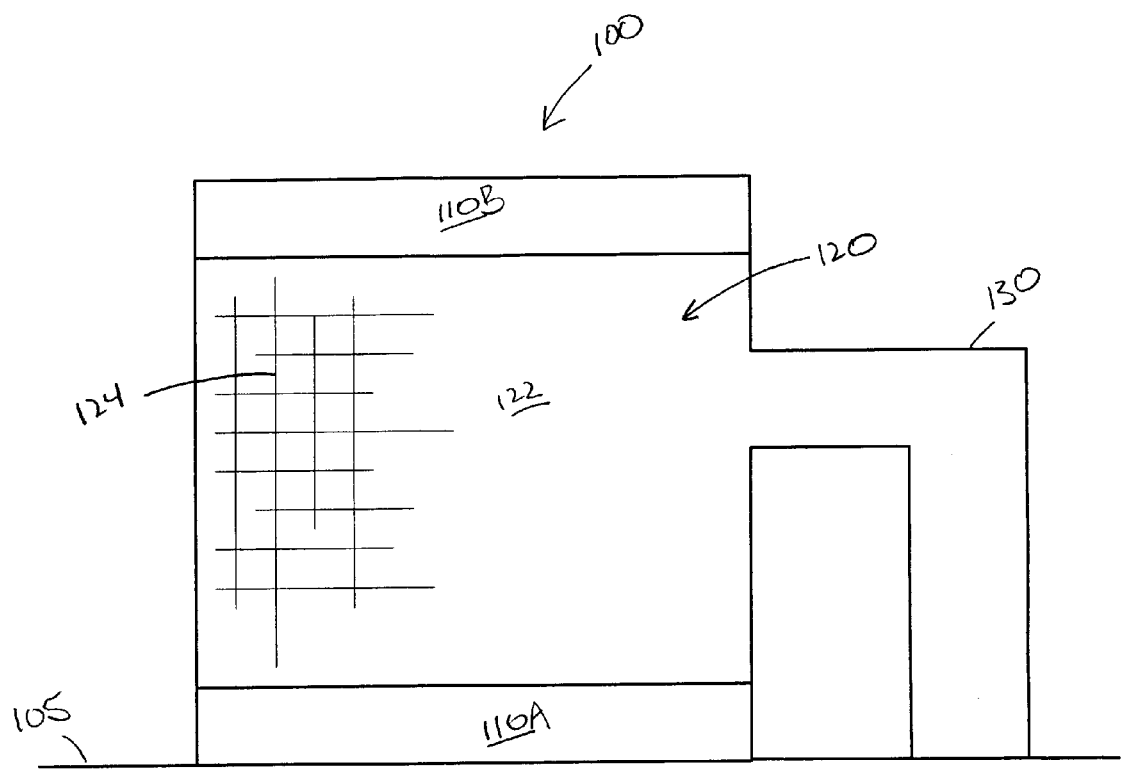
FIG. 1 is a block diagram showing the exterior of Applicant's evaporative cooling apparatus.

In the illustrated embodiment of FIG. 1, Applicant's evaporative cooling apparatus 100 is shown disposed on support element 105. In certain embodiments, element 105 comprises a portion of the roof of a building. In other embodiments, element 105 comprises a concrete pad. Further in the illustrated embodiment of FIG. 1, apparatus 100 is shown interconnected with air duct 130 which directs cooled air emitted from apparatus 100 to a target location, such as for example the interior of a structure.

Applicant's cooling apparatus 100 comprises bottom 110A, vertical element 120, and top 110B. Vertical element 120 comprises a U-shaped continuous porous material 122 and a supporting mesh 124.

In certain embodiments, vertical element 120 comprises one supporting mesh attached to the exterior surface of porous material 122. In other embodiments, vertical element 120 comprises a first supporting mesh 124 attached to the exterior surface of porous material 122 and a second supporting mesh 124 attached to the interior surface of porous material 122.

Vertical element 120 is between about 1 inch and 3 inches thick. Vertical element 120 is between about 30 inches and about 50 inches in height. Vertical element 120 is between about 90 inches and about 150 inches in total length. In certain embodiments, porous material 122 is formed from paper. In other embodiments, porous material 122 comprises an open cell foam material formed paper, cardboard, polyurethane, polystyrene, combinations thereof, and the like.

As described above, element 110A and 110B are identical, and are referred to hereinafter as element 110. Element 110 comprises four walls 305 (FIG. 3) and a floor 302 (FIG. 3), which in combination define a five-sided enclosure having an open end. The distal edges of walls 305 are formed to include an outwardly curving lip 310 (FIGS. 3,4).

In certain embodiments, element 110 is formed from metal. In other embodiments, element 110 is formed from one or more polymeric materials, i.e. plastic. Element 110 is between about 30 inches and about 50 inches in length and about 30 inches and about 50 inches in width. The walls of element 110 are between about 3 inches and about 6 inches in height.

As described hereinabove, using prior art evaporative cooler housings, air can be drawn into the cooler device through, at the most, about fifty percent of the surface area of the sides. In contrast using Applicant's vertical element 120, air can be drawn into Applicant's cooling apparatus 100 through more than about ninety percent (90%) of the surface area of vertical element 120.

Figure 2:
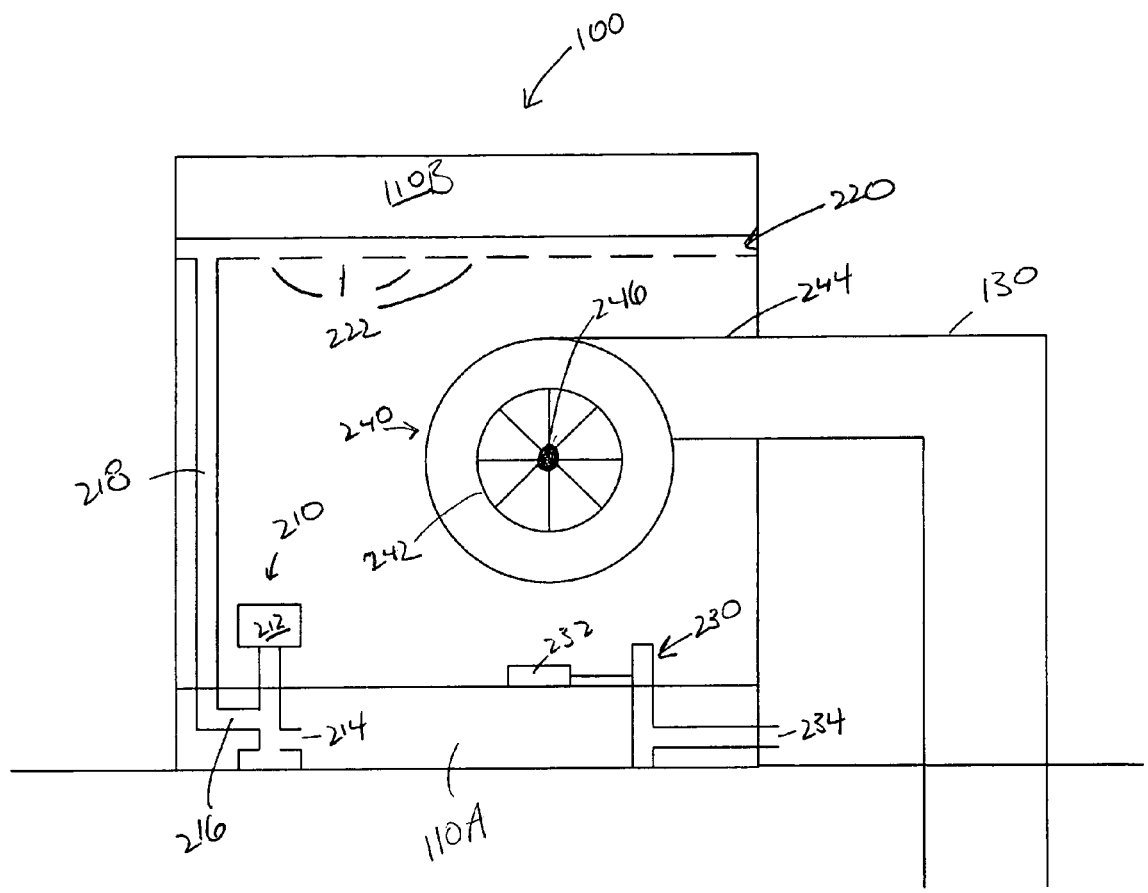
FIG. 2 is a block diagram showing certain additional elements of Applicant's evaporative cooling apparatus.

Referring now to FIG. 2, Applicant's apparatus 100 further comprises blower assembly 240. A motor 246 rotates a "squirrel cage" air handler 242 such that air is drawn into apparatus 100 through vertical element 120 and expelled from apparatus 100 through outlet 244 into air duct 130.

Applicant's apparatus 100 further comprises a water valve 230 which comprises a water inlet 234 which is interconnected to an external source of water. Valve 230 further comprises a float 232. Valve 230 permits water from the external source to fill bottom 110A until float assembly 232 reaches a preset orientation. As the water level in element 110A drops, float 232 drops, and water again fills bottom 110A.

Apparatus 100 further comprises water pump 210. Water pump 210 comprises water inlet 214 which is disposed below the top of the water in bottom 110A. Motor 212 draws water into inlet 214 and expels that water out from water outlet 216 into conduit 218. Conduits 218 communicates with drip tube 220. Drip tube 220 has a U-shape and is disposed adjacent the top of vertical element 120. Drip tube 220 is formed to include a plurality of apertures 222.

In operation, air water pump 210 pumps water from bottom 110A, through conduit 218, into drip tube 220. Water is released from apertures 222, soaks porous material 122, and returns to bottom 110A. At the same time, blower 240 draws ambient air having a first temperature through soaked porous material 122 into the interior of apparatus 100. As the heated air passes through the wet porous material 122 a quantity of water is caused to evaporate and thereby cool the ambient air to a second temperature, wherein the second temperature is less that the first temperature. The difference between the first temperature and the second temperature is a function of, inter alia, the ambient humidity. A lower ambient humidity results in an increased cooling efficiency.

Referring now to FIG. 3, a preferred embodiment of the invention uses a single vertical element 120 which extends around three sides of the cooler. The fourth side is the side draft provided by the housing for the blower assembly 240 (FIG. 2). This configuration allows vertical element 120 (FIGS. 1, 2, 3) to be easily replaced with a single cut instead of the prior art's use of multiple cuts.

In addition, apparatus 100 is easily disassembled. This allows the home owner to simply and easily "remove" the cooler's parts from the home during the winter. The pieces are easily cleaned, lubricated, and repaired on the ground as opposed to performing the operation on a slanted roof line. Because the cleansed parts can be stored inside, the need for re-clean at start-up is eliminated. Using the present invention, even the water valve assembly 230 (FIG. 2) is easily replaced since it is quickly removed from the apparatus 100.

Evaporative cooler apparatus 100 comprises a rigid frame 340 which is used to support the various pieces which make up the assembled evaporative cooler. Mounted to rigid frame 340 is a front panel 330. Rigid frame portion 342 supports the blower assembly 240 which is used in this side-draft embodiment to deliver an air flow to the dwelling.

At the bottom of rigid frame 340 is a pan frame 344. Pan frame 344 is used to support bottom 110A which serves as the water reservoir. The distal edges of walls 305 (FIGS. 3, 4) are formed to include an outwardly curving lip 310 (FIGS. 3, 4). Lip 310 of bottom 110A rests against pan frame 344.

FIG. 4 shows a cross sectional view of top 110B removeably disposed on vertical element 120 (FIGS. 1, 3, 4). Bracket assembly 410 comprises a downwardly facing three-sided element 412 in combination with an upwardly facing U-shaped element 414. In the illustrated embodiment of FIG. 4, element 412 is removeably disposed around the top of vertical element 120 such that U-shaped element 414 faces upwardly. Wall 305, including lip 310, is removeably inserted into element 414 thereby fixturing top 110B to vertical element 120.

While the preferred embodiments of the present invention have been illustrated in detail, it should be apparent that modifications and adaptations to those embodiments may occur to one skilled in the art without departing from the scope of the present invention as set forth in the following claims.

I claim:

1. An evaporative cooler apparatus, comprising:
   a bottom;
   a top, wherein said bottom and said top are identically dimensioned, and wherein said top and said bottom are interchangeable;
   a U-shaped vertical element disposed between said bottom and said top, wherein said vertical element comprises a porous material;
   wherein said evaporative cooler apparatus does not comprise one or more metal or plastic sides formed to include a plurality of apertures;
   a blower assembly comprising a motor and an air outlet;
   a panel interconnecting a portion of said bottom to a portion of said top, wherein said air outlet extends outwardly through said panel;
   wherein said top, said bottom, said vertical element, and said panel, define an enclosure having said air outlet extending therethrough, and wherein said blower assembly is disposed within said enclosure; and
   a frame disposed within said enclosure, wherein said frame comprises a vertical portion, a horizontal pan frame, and a diagonal portion interconnecting said vertical portion and said pan frame.

2. The apparatus of claim 1, wherein said panel is attached to said vertical portion of said frame.

3. The apparatus of claim 2, wherein said blower assembly is attached to said diagonal portion of said frame.

4. The apparatus of claim 3, wherein said bottom comprises a floor and four walls attached to and extending outwardly from said floor.

5. The apparatus of claim 4, wherein:
   the distal edge of each of said four walls comprises an outwardly curving lip; and
   said outwardly curving lips rest on said horizontal pan frame.

6. The apparatus of claim 5, further comprising:
   a water pump;
   a U-shaped drip tube, wherein said drip tube is disposed adjacent the top of said vertical element and within said enclosure;
   a water conduit interconnecting said water pump and said drip tube.

7. The apparatus of claim 6, wherein said vertical element further comprises a top, further comprising a bracket comprising a downwardly facing three-sided portion in combination with an upwardly facing U-shaped portion, wherein said downwardly facing three-sided portion is dimensioned such that the top portion of said vertical element can be removeably inserted therein, and wherein said upwardly facing U-shaped portion is dimensioned such that the distal end of a wall of said top can be removeably inserted therein.

* * * * *